(12) United States Patent
Park et al.

(10) Patent No.: US 9,577,282 B2
(45) Date of Patent: Feb. 21, 2017

(54) REDOX FLOW BATTERY

(71) Applicant: Samsung Electronics Co., Ltd., Suwon-si, Gyeonggi-do (KR)

(72) Inventors: Joungwon Park, Seongnam-si (KR); Myungjin Lee, Seoul (KR); Seungsik Hwang, Seongnam-si (KR); Dooyeon Lee, Yongin-si (KR); Dukjin Oh, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/004,899

(22) Filed: Jan. 23, 2016

(65) Prior Publication Data

US 2016/0141699 A1 May 19, 2016

Related U.S. Application Data

(62) Division of application No. 13/267,203, filed on Oct. 6, 2011, now Pat. No. 9,302,596.

(30) Foreign Application Priority Data

Dec. 31, 2010 (KR) .................. 10-2010-0140676

(51) Int. Cl.
 *H01M 8/18* (2006.01)
 *H01M 8/20* (2006.01)
 *B60L 11/18* (2006.01)

(52) U.S. Cl.
 CPC ......... *H01M 8/188* (2013.01); *B60L 11/1879* (2013.01); *H01M 8/20* (2013.01); *H01M 8/18* (2013.01); *H01M 2250/20* (2013.01); *Y02E 60/528* (2013.01); *Y02T 10/705* (2013.01); *Y02T 10/7005* (2013.01); *Y02T 10/7011* (2013.01)

(58) Field of Classification Search
None
See application file for complete search history.

(56) References Cited

U.S. PATENT DOCUMENTS

| 4,591,453 | A  | 5/1986 | Kobayashi |
| 6,764,789 | B1 | 7/2004 | Sekiguchi et al. |
| 2009/0017379 | A1 | 1/2009 | Inatomi et al. |
| 2011/0195283 | A1 | 8/2011 | Sun et al. |
| 2012/0135278 | A1 | 5/2012 | Yoshie et al. |
| 2012/0171530 | A1 | 7/2012 | Lee et al. |

FOREIGN PATENT DOCUMENTS

| CN | 101651201 A | 2/2010 |
| JP | 63114066 A | 5/1988 |
| KR | 1020110089079 A | 8/2011 |
| WO | 2010037138 A3 | 4/2010 |
| WO | 2010143634 A1 | 12/2010 |

OTHER PUBLICATIONS

Chakrabarti, et al., Analysis of Mixtures of Ferrocyanide and Ferricyanide using UV-Visible Spectroscopy for Characterisation of a Novel Redox Flow Battery, J.Chem.Soc.Pak., vol. 30, No. 6, 2008, pp. 817-823.
Yamamura, et al., Characterization of tetraketone ligands for active materials of all-uranium redox flow battery, Journal of Alloys and Compounds, Elsevier, 374 (2004) pp. 349-353.

*Primary Examiner* — Ladan Mohaddes
(74) *Attorney, Agent, or Firm* — Cantor Colburn LLP

(57) ABSTRACT

A redox flow battery. A metal-ligand coordination compound including an aromatic ligand that contains an electron withdrawing group is used as the catholyte and/or the anolyte so that a redox flow battery having high energy density and excellent charge/discharge efficiency may be provided.

13 Claims, 5 Drawing Sheets

REDOX FLOW BATTERY

CROSS-REFERENCE TO RELATED APPLICATIONS

This application is a divisional of U.S. patent application Ser. No. 13/267,203, filed on Oct. 6, 2011, which claims the benefit of Korean Patent Application No. 10-2010-0140676, filed on Dec. 31, 2010, in the Korean Intellectual Property Office, the disclosure of which is incorporated herein in its entirety by reference.

BACKGROUND OF THE INVENTION

1. Field

The present disclosure relates to redox flow batteries, and more particularly, to redox flow batteries having high energy densities and charge/discharge efficiencies.

2. Description of the Related Art

Secondary batteries are high-efficiency storage systems and are used in various applications from small mobile phones to middle and large power storage units. In particular, the secondary battery is used as the main component in semiconductor and liquid crystal applications, audio and video applications, and information communication applications such as mobile phones and laptops and, recently, as power sources in hybrid electric vehicles.

Such power storage systems are required to have stable energy supply and high energy conversion efficiency. Recently, there has been interest in redox flow batteries as secondary batteries having high output power and high durability that are most suitable for large-sized power storage systems.

Unlike other batteries, the active materials in the redox flow battery exist as ions in an aqueous solution state instead of a solid state, and the redox flow battery operates by a mechanism that stores and generates electric energy due to oxidation/reduction reactions of the ions in the positive and negative electrodes.

That is, the redox flow battery contains an electrolyte (solution) state, in which the active materials of the electrode are dissolved in a solvent. When a battery including a catholyte (electrolyte adjacent to the cathode in an electrochemical cell) and an anolyte (electrolyte adjacent to the anode in an electrochemical cell), each having different oxidation numbers, is charged, an oxidation reaction and a reduction reaction occur in the positive electrode and the negative electrode, respectively. The electromotive force (EMF) of the battery is determined by the difference in the standard electrode potential)($E°$ of the redox couple forming the catholyte and the anolyte. On the other hand, where the electrolyte is supplied from an electrolyte tank by a pump, then the redox flow battery has both the advantage of a general battery that has rapid oxidation and reduction reaction speeds on the surfaces of the positive electrode and the negative electrode and the advantage of a fuel cell that has high output power.

SUMMARY OF THE INVENTION

Provided are redox flow batteries having high energy densities and excellent charge/discharge efficiencies.

Additional aspects will be set forth in part in the description which follows and, in part, will be apparent from the description, or may be learned via practice of the presented embodiments by those skilled in the art.

According to an aspect of the invention, a redox flow battery is provided which includes: a positive electrode cell comprising a positive electrode and a catholyte solution; a negative electrode cell comprising a negative electrode and an anolyte solution; and an ion exchange membrane interposed between the positive electrode cell and the negative electrode cell, wherein the catholyte solution and the anolyte solution each include a solvent, a supporting electrolyte, and at least one metal-ligand coordination compound, and wherein at least one of the metal-ligand coordination compounds includes an aromatic ligand that contains an electron withdrawing group.

Another embodiment of the invention relates to a catholyte solution comprising a non-aqueous solvent, a supporting electrolyte, and at least one metal-ligand coordination compound, wherein at least one of the metal-ligand coordination compounds includes an aromatic ligand that contains an electron withdrawing group.

A still further embodiment of the invention concerns a positive electrode cell comprising a positive electrode and the above-described catholyte solution.

An additional aspect of the invention relates to an anolyte solution comprising a non-aqueous solvent, a supporting electrolyte, and at least one metal-ligand coordination compound, wherein at least one of the metal-ligand coordination compounds includes an aromatic ligand that contains an electron withdrawing group.

A still further aspect of the invention concerns a negative electrode cell comprising a negative electrode and the above-described anolyte solution.

The ligand in the metal-ligand coordination compound may be, but is not limited to, at least one selected from the group consisting of dipyridyl, terpyridyl, phenanthroline, acetylacetonate, ethylenediamine, propylenediamine, and N-heterocyclic carben (NHC).

The electron withdrawing group may be but is not limited to, a halogen atom, oxygen atom, a phosphorous atom, a sulfur atom, a nitro group, a nitrile group, or a phenyl group.

The metal-ligand coordination compound is subject to a reversible oxidation and reduction reaction.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE INVENTION

Figure 1:
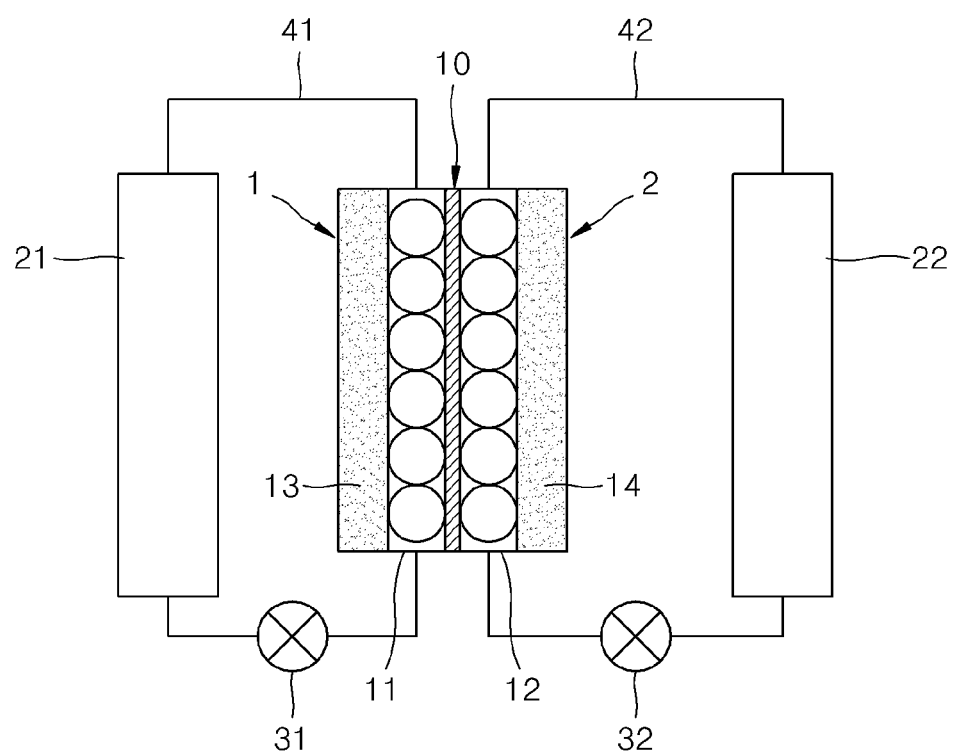
FIG. 1 schematically illustrates a redox flow battery according to an embodiment of the invention.
Figure 2A:
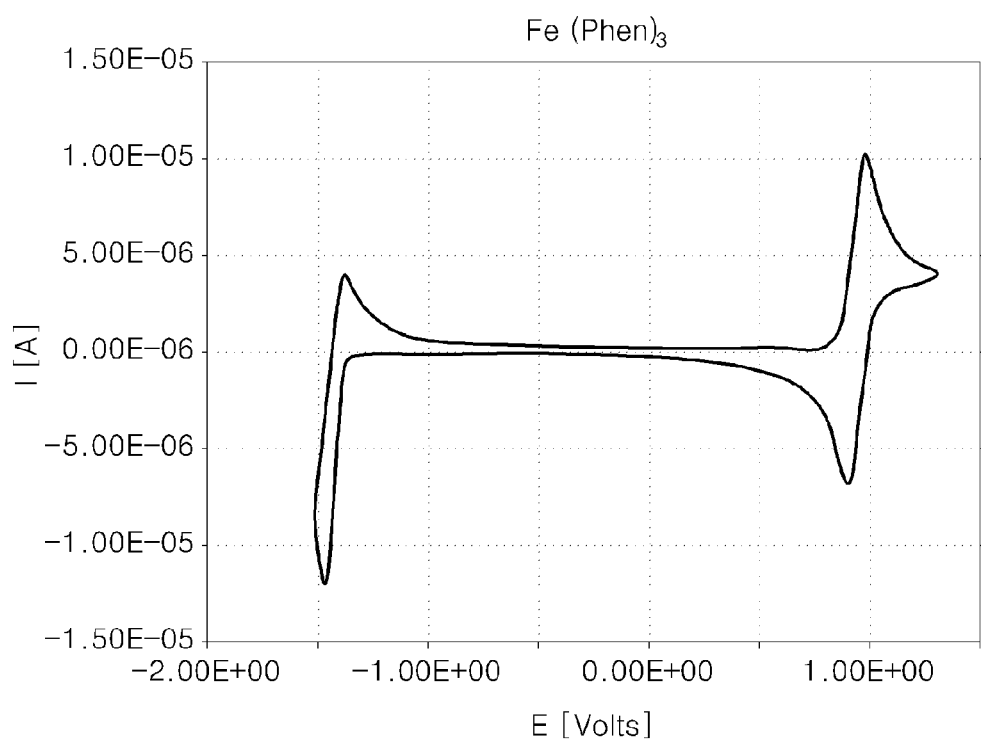
FIGS. 2A through 2D are cyclic voltammetry graphs of organic electrolyte solutions including electrolytes obtained in Preparation Examples 1 through 4.
Figure 2B:
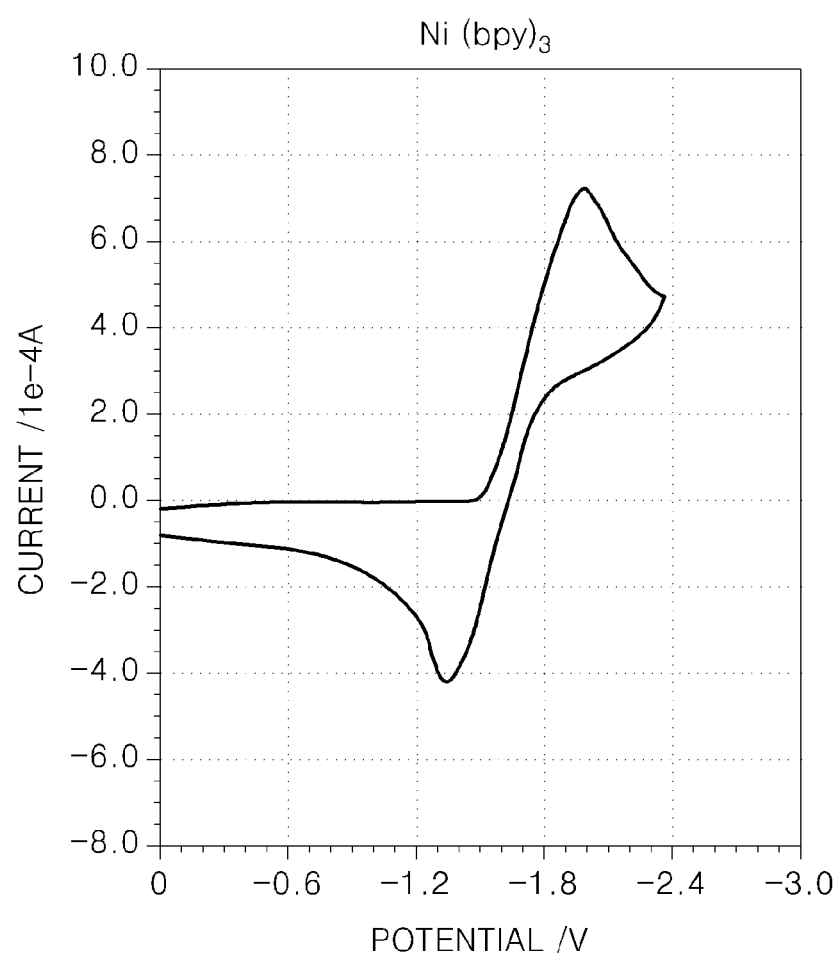
Figure 2C:
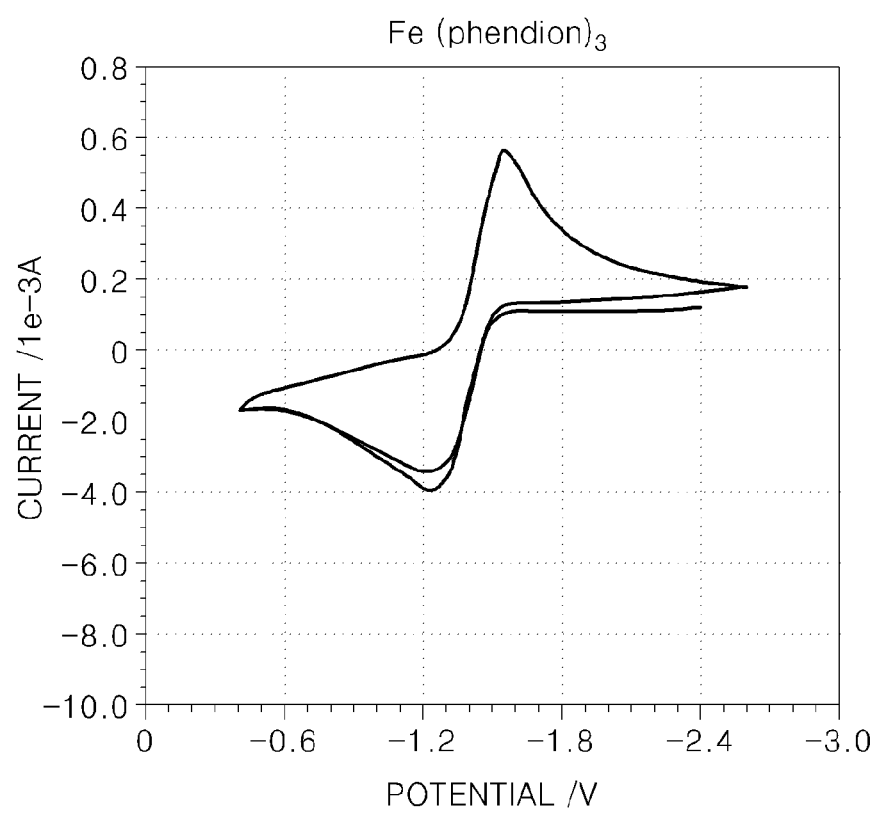
Figure 2D:
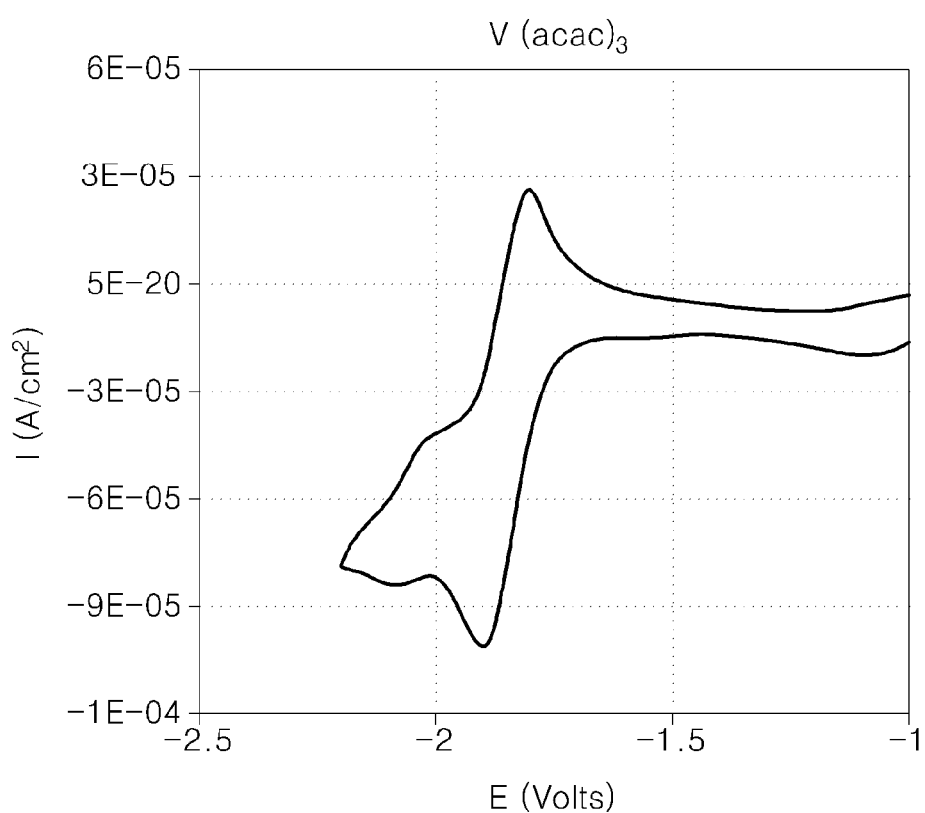

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a redox flow battery according to one or more embodiments of the invention will be described in detail.

FIG. 1 schematically illustrates a redox flow battery according to an embodiment of the invention.

Referring to FIG. 1, the redox flow battery is divided into a positive electrode cell 1 and a negative electrode cell 2 by an ion exchange membrane 10. The positive electrode cell 1 and the negative electrode cell 2 include a positive electrode 13 and a negative electrode 14, respectively. The positive electrode cell 1 is connected to a catholyte solution tank 21 used to supply and discharge a catholyte solution 11 through a pipe 41. Similarly, the negative electrode cell 2 is connected to an anolyte solution tank 22 used to supply and discharge an anolyte solution 12 through a pipe 42. The catholyte solution 11 and the anolyte solution 12 circulate through pumps 31 and 32, respectively, and charging/discharging occurs according to the change of the oxidation states of ions in the positive electrode 13 and the negative electrode 14.

The ion exchange membrane 10 prevents active material ions of the catholyte solution 11 and the anolyte solution 12 from being mixed and only allows transmission of charge carrier ions of the supporting electrolyte.

The redox flow battery according to an embodiment of the invention includes: a positive electrode cell comprising a positive electrode and a catholyte solution; a negative electrode cell comprising a negative electrode and an anolyte solution; and an ion exchange membrane interposed between the positive electrode cell and the negative electrode cell, wherein the catholyte solution and the anolyte solution each comprise a solvent, a supporting electrolyte, and at least one metal-ligand coordination compound, and wherein at least one of the metal-ligand coordination compounds contains an aliphatic ligand that contains an electron withdrawing group.

The redox flow battery is discharged by being connected to an external circuit including an electric load, thereby causing a current to flow to the external circuit, and is charged by being connected to an external power source, thereby supplying a current to the redox flow battery.

In general, the catholyte is charged when the redox couple is oxidized to a higher oxidation state from among two oxidation states and is discharged when the redox couple is reduced to a lower oxidation state from among two oxidation states. Alternatively, an anolyte is charged when the redox couple is reduced to a lower oxidation state from among two oxidation states and is discharged when the redox couple is oxidized to a higher oxidation state from among two oxidation states.

A Positive Electrode
$C^n \rightarrow C^{n-y} + ye^-$ (charge)
$C^{n-y} + ye^- \rightarrow C^n$ (discharge)
(C: catholyte)
A Negative Electrode
$A^{n-x} + xe^- \rightarrow A^n$ (charge)
$A^n \rightarrow A^{n-x} + xe^-$ (discharge)
(A: anolyte)

In a conventional redox flow battery using an aqueous solvent, the operation potential is limited to the water decomposition potential region so that the operating voltage is low and thus energy density is low. Accordingly, a non-aqueous solvent is used to solve the above problem; however, an organic electrolyte which may achieve a high voltage is still required.

In embodiments of the invention, a catholyte solution and an anolyte solution are provided, each comprising an electrolyte including at least one metal-ligand coordination compound, and wherein at least one of the metal-ligand coordination compounds in each containins an aliphatic ligand that contains an electron withdrawing group, thereby enabling the provision of a redox flow battery having high charge/discharge efficiency and energy efficiency.

The metal in the metal-ligand coordination compound may be, but is not limited to, at least one selected from the group consisting of Ni, Co, Fe, Ru, Zn, Mn, Y, Zr, Ti, Cr, Mg, Ce, Cu, Pb, and V.

The ligand in the metal-ligand coordination compound may be, but is not limited to, an aromatic ligand or an aliphatic ligand. Examples of the ligand include at least one selected from the group consisting of dipyridyl, terpyridyl, phenanthroline, acetylacetonate, ethylendiamine, propylenediamine, and N-heterocyclic carben (NHC). Examples of the NHC ligand may include 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-Dicyclohexylimidazole, or 1-ethyl-3-methylimidazole.

A reversible oxidation/reduction reaction occurs in the metal-ligand coordination compound.

Examples of the metal-ligand coordination compound may be represented as follows:

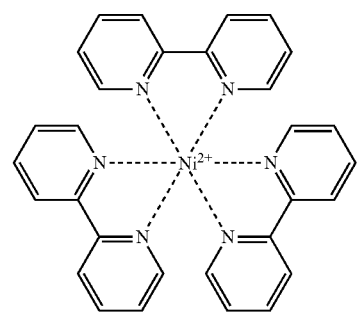

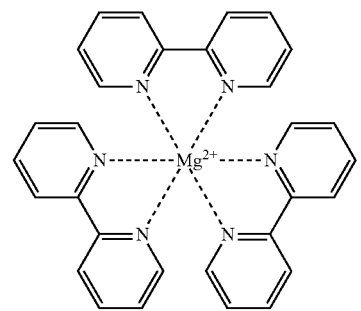

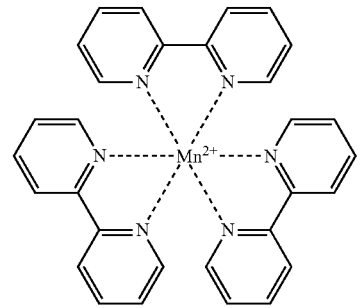

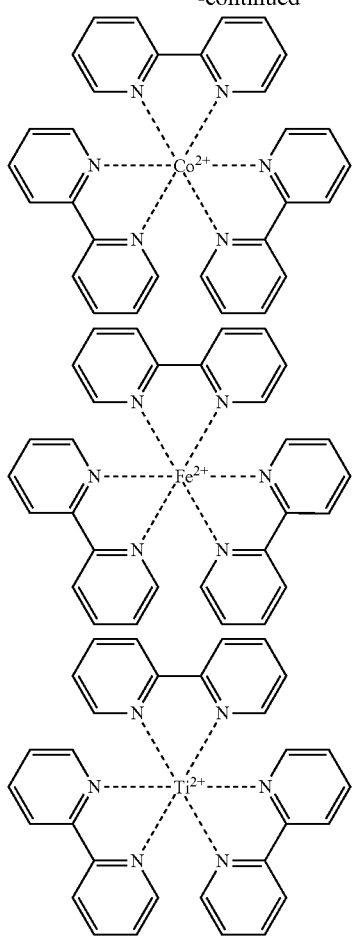
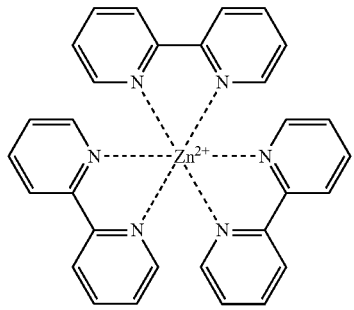
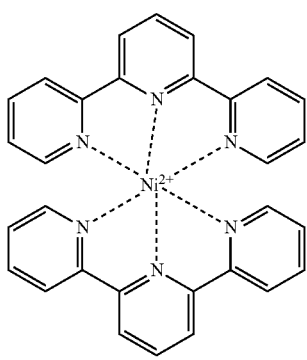
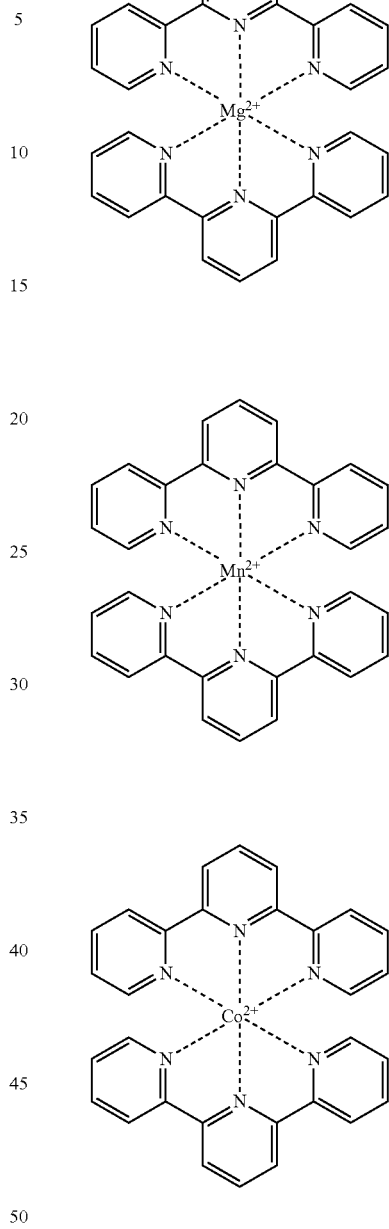
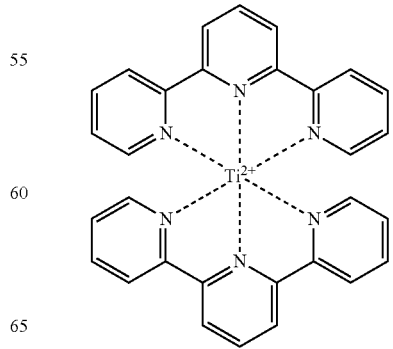

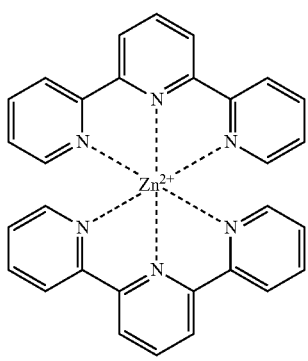
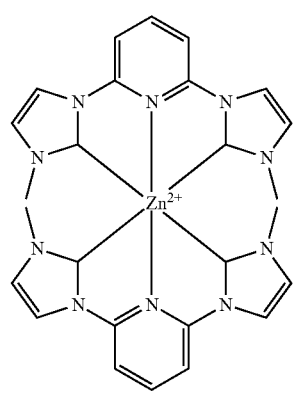
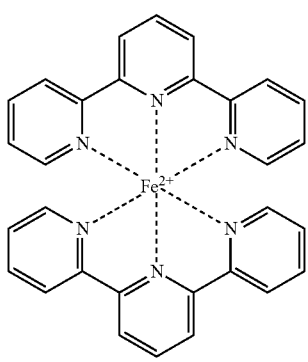
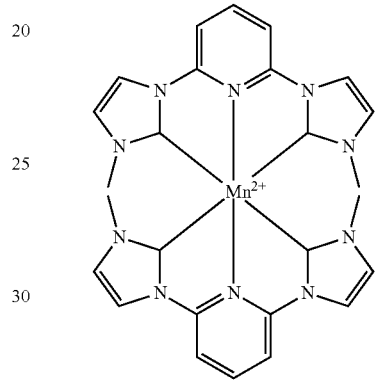
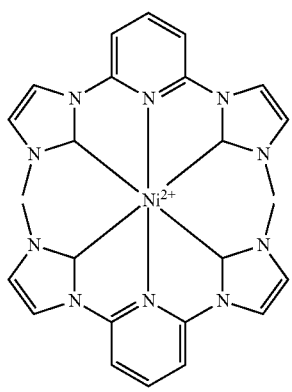
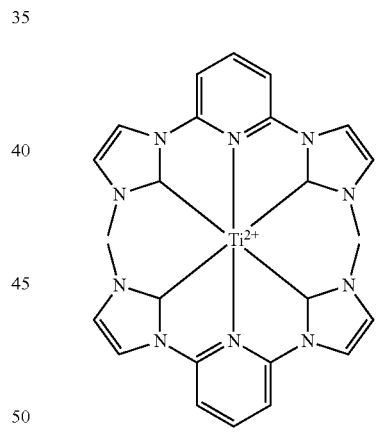
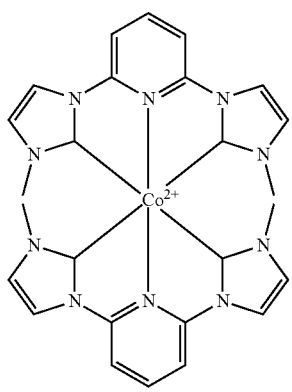
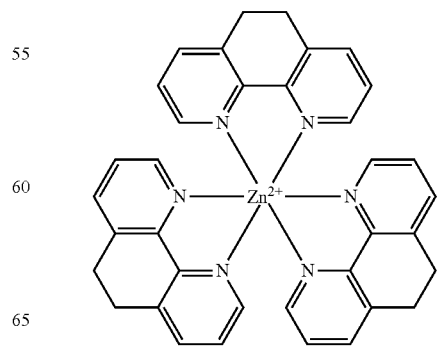

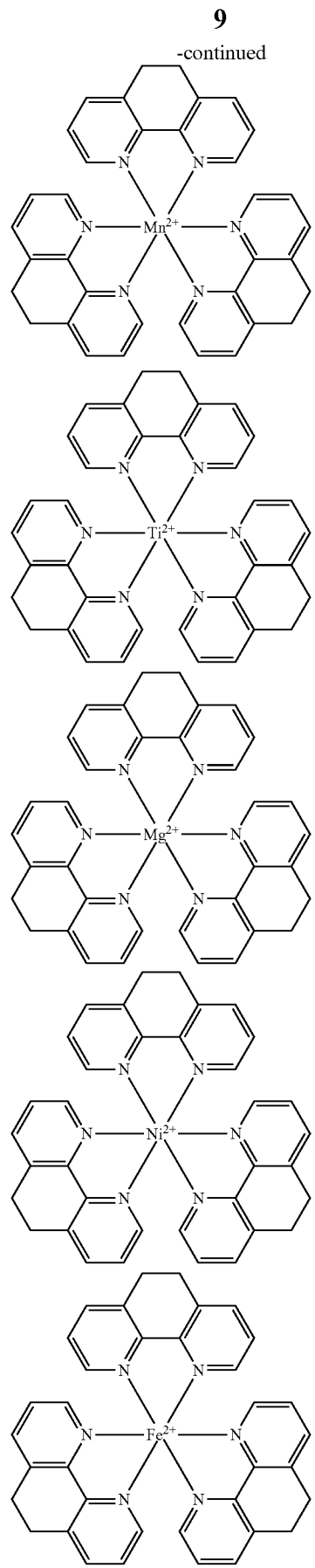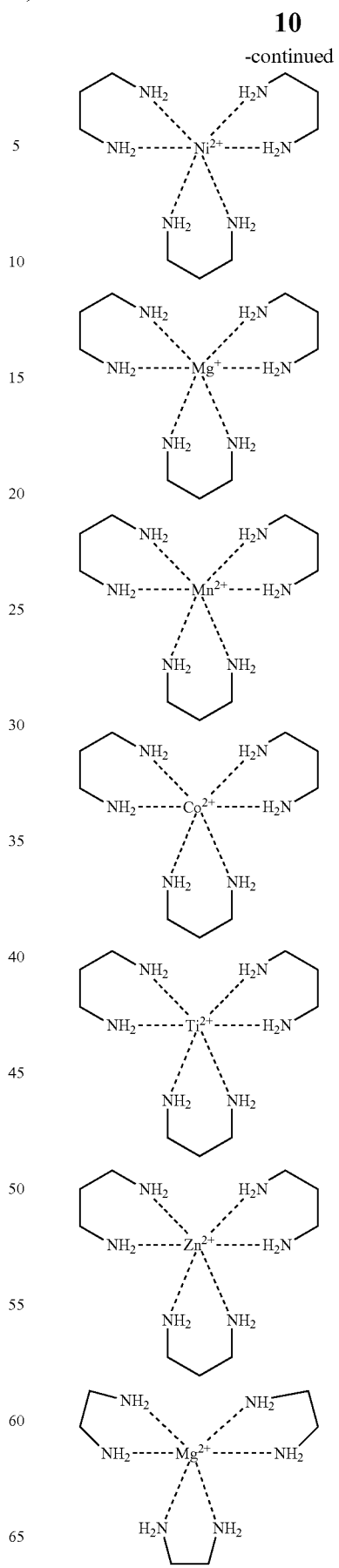

-continued

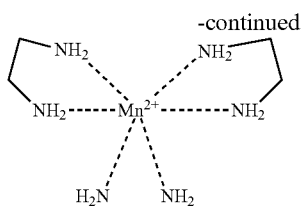

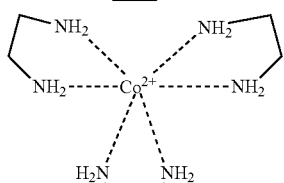

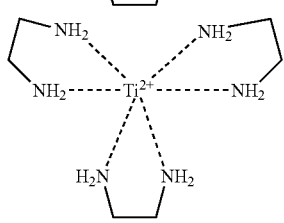

or

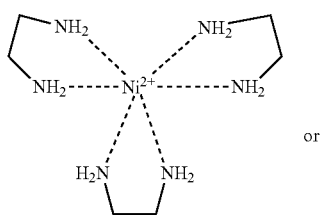

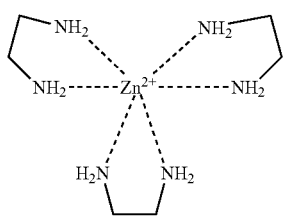

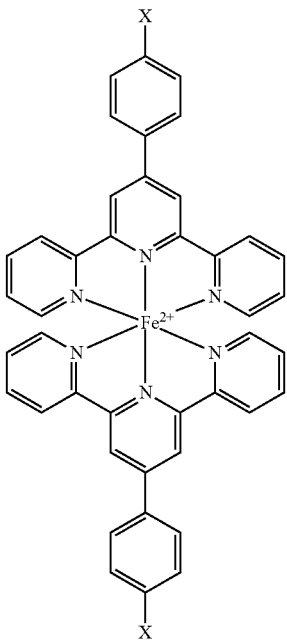

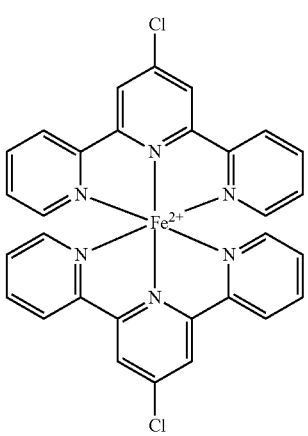

Where the ligand is aromatic, it may contain an electron withdrawing group.

Where the metal-ligand coordination compound includes an aromatic ligand that contains an electron withdrawing group, the electron withdrawing group minimizes the electron cloud of the metal of the coordination compound and thus increases the OCV value of the battery.

Examples of electron withdrawing groups include a halogen atom, oxygen atom, and a phosphorous atom, a sulfur atom, a nitro group, a nitrile group, or a phenyl group. The phenyl group may be substituted with a halogen atom or a hydroxyl group.

The aromatic ligand may be a hetero aromatic ligand containing a nitrogen atom and may be, for example, phenanthroline, bipyridine, or terpyridine.

Examples of the metal-ligand coordination compound including the aromatic ligand containing the electron withdrawing group may be represented as follows:

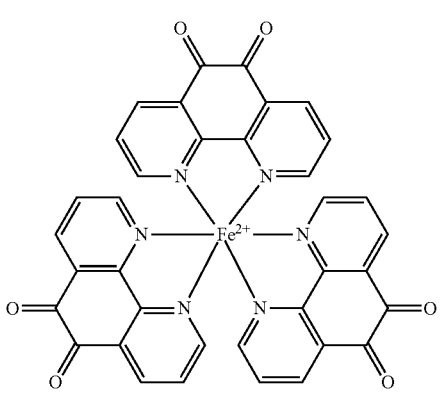

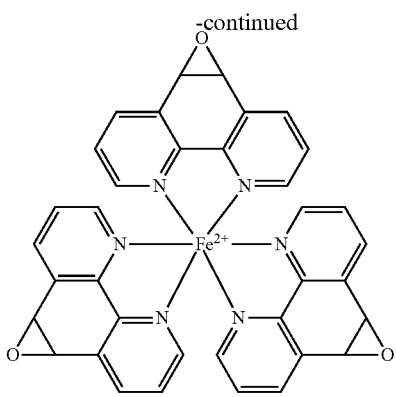

In the above formula, X may be OH, H, Br, or Cl.

The concentration of the metal-ligand coordination compound in the electrolyte solution may be in a range of about 0.1 M to about 3 M. When the concentration of the metal-ligand coordination compound is in the above range, battery storage characteristics are provided.

The metal-ligand coordination compound may further include $BF_4^-$, $PF_6^-$, $CF_3SO_3^-$, or $(CF_3SO_2)_2N^-$ as a counter anion.

Examples of the solvent include an aqueous solvent, a non-aqueous solvent or an ionic liquid.

Examples of the non-aqueous solvent include, but are not limited to, at least one selected from the group consisting of dimethylacetamide, diethylcarbonate, dimethylcarbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide.

The redox flow battery may further include the catholyte solution tank 21 and the anolyte solution tank 22 that are fluid connected to the positive electrode cell 1 and the negative electrode cell 2, respectively.

Any of the ion exchange membranes conventionally used in redox flow batteries may be used as the ion exchange membrane 10. A cation exchange membrane may be obtained by sulfonating a styrene-divinylbenzene copolymer, by introducing a sulfonic acid group into a copolymer of tetrafluoroethylene and perfluorosulfonylethoxyvinylether, formed of a copolymer of tetrafluoroethylene and perfluorovinylether having a carboxyl group as a side chain, or by introducing a sulfonic acid group into an aromatic polysulfone copolymer.

When a conventional cation exchange membrane is used, salts of $Na^+$, $Li^+$, and $H^+$ cation are used as sources of charge carriers. However, the solubility of such salts decreases in an organic solvent. When a small amount of water is added in order to increase solubility, the ligand becomes unstable and thus the oxidation/reduction reaction is not completely reversible. On the other hand, when an anion exchange membrane is used, salts having high solubility may be used in an organic solvent so that water may be completely eliminated. The ligand is prevented from becoming unstable, and the oxidation/reduction reaction of the metal-ligand coordination compound remains reversible, thereby improving the cycle characteristics and the voltage characteristics of the battery.

The anion exchange membrane prevents the catholyte and the anolyte from mixing, allows counter anions of the metal-ligand coordination compound to be used as charge carriers, ensures concentration of a sufficient amount of charge carriers with a small amount of supporting electrolyte, and suppresses movement of active materials which are cations, thereby providing high charge/discharge efficiencies and voltage efficiencies.

The anion exchange membrane may be obtained by aminating a copolymer of styrene-divinylbenzene by introducing a chloromethyl group, by substituting a copolymer of vinylpyridine-divinyl benzene with quaternary pyridium, or by aminating an aromatic polysulfone copolymer by introducing a chloromethyl group.

Anion exchange membranes being sold in the market include NEOSEPTA®-AMEX, NEOSEPTA®-AHA, and NEOSEPTA®-ACS from ASTOM, Cybron ionan MA3475 from LANXESS, FAS, FAB, FAN, FAA, FAD from FuMa-atech, and PC 100D, PC 200D, and PC-SA from Polymerchemie Altmeier (PCA).

The supporting electrolyte does not directly participate in the reaction and functions as a charge balance between the catholyte and anolyte.

Examples of the supporting electrolyte include, but are not limited to, at least one selected from the group consisting of $LiBF_4$, $LiPF_6$, $LiClO_4$, $LiCF_3SO_3$, $Li(CF_3SO_2)_2N$, $TEABF_4$ (triethylamine tetrafluorborate), $TBABF_4$ (tributhylamine tetrafluorborate), $NaBF_4$, $NaPF_6$, trimethylsulfonylchloride, and $(NH_4)_2SO_4$. When the supporting electrolyte is used instead of sulphuric acid, a non-aqueous solvent may be used to manufacture the electrolyte.

The concentration of the supporting electrolyte may be 3M or below in the electrolyte. When the concentration of the supporting electrolyte is in the above range, the supporting electrolyte will not prevent the flowing of charges and supports movement of charges.

Examples of the charge carrier that pass through the ion exchange membrane include but are not limited to $Li^+$, $Na^+$, $Cl^-$, $Br^-$, $I^-$, $SO_4^{2-}$, $BF_4^-$, $PF_6^-$, $ClO_4^-$, $CF_3SO_3^-$, or $(CF_3SO_2)_2N^-$.

The redox flow battery is suitable for use in not only mobile phones, mobile computers, and the like but also in electric vehicles that require high capacity and high output power. Also, the redox flow battery may be combined with general internal-combustion engines, fuel cells, and super capacitors and used in hybrid vehicles. In addition, the redox flow battery may be used in various other applications that require high output power and high voltage.

Hereinafter, the invention will be described more fully with reference to Examples and Comparative Examples; however, it is not limited thereto.

Preparations Example 1

$Fe^{2+}$-$(bpy)_3[BF_4]_2$—Transfer of One Electron 15.24 g (29.88 mmol) of $Fe(BF_4)_2 \cdot 6H_2O$ was put into a 100 ml round-bottom flask and 50 ml of ethanol was added to the flask to form a mixture. Then, the mixture was stirred for 20 minutes until the mixture was in a solution state.

14 g (89.64 mmol) of bipyridine was put into another 100 ml round-bottom flask and 80 ml of ethanol was added to the flask to form a mixture. Then, the mixture was stirred for 10 minutes until the mixture was in a solution state.

The bipyridine solution was gradually added to the $Fe(BF_4)_2 \cdot 6H_2O$ solution to form a mixture solution. Then, the mixture solution was stirred for 3 hours at room temperature until the mixture solution gradually turned red. The resultant solution was filtered, and washed 3 times using 150 ml of water and ethanol, naturally dried, and further dried in a vacuum oven, thereby obtaining 16.632 g (79.7%) of a dark red solid.

Preparations Example 2

$Ni^{2+}$-(bpy)$_3$[BF$_4$]$_2$—Transfer of Two Electrons 7.99 g (23.48 mmol) of Ni(BF$_4$)$_2$.6H$_2$O was put into a 100 ml round-bottom flask and 50 ml of ethanol was added to the flask to form a mixture. Then, the mixture was stirred for 20 minutes until the mixture was in a solution state. 11 g (70.43 mmol) of bipyridine was put into another 100 ml round-bottom flask and 90 ml of ethanol was added to the flask to form a mixture. Then, the mixture was stirred for 10 minutes until the mixture was in a solution state.

The bipyridine solution was gradually added to the Ni(BF$_4$)$_2$.6H$_2$O solution to form a mixture solution. Then, the mixture solution was stirred for 2.5 hours at room temperature until the mixture solution gradually turned from green to pink. The resultant solution was filtered, washed 3 times using 150 ml of water and ethanol, naturally dried, and further dried in a vacuum oven, thereby obtaining 15.09 g (91.7%) of a pink solid.

Preparations Example 3

$Fe^{2+}$-[Phendion]$_3$[BF$_4$]$_2$—Transfer of One Electron 2.692 g of FeSO$_4$.6H$_2$O and 30 ml of methanol were put into a 100 ml round-bottom flask to form a mixture. Then, the mixture was stirred for about 5 to 20 minutes until the mixture was in a solution state. 6.306 g of phenanthrolinedion and 60 ml of methanol were put in a separate 50 ml round-bottom flask to form a mixture. Then, the mixture was stirred for about 5 to 10 minutes until the mixture was in a solution state. The phenanthrolinedion solution was gradually added to the FeSO$_4$.6H$_2$O solution and stirred to form a mixture solution. Then, 5.490 g of NaBF$_4$ was added to the mixture solution and stirred for about 30 minutes. The resultant solution was filtered, washed several times using water and ethanol, and vacuum dried, thereby obtaining 6.88 g of $Fe^{2+}$-(Phendion)$_3$[BF$_4^-$]$_2$.

Preparations Example 4

$V^{3+}$-[acac]$_3$[BF$_4$]$_2$—Transfer of One Electron $V^{3+}$-[acac]$_3$[BF$_4$]$_2$ was manufactured by mixing vanadium (III) acetylacetonate purchased from Aldrich and TEABF$_4$.

Cyclic Voltammetry

Electrolytes obtained in Preparation Examples 1 through 4 above were used to measure changes in current values according to potential changes during 20 cycles at a scan rate of 100 mV/s with a scan range of about −0.2 V to about 1.5V in Fe(bpy)$_3$(BF$_4$)$_2$, about −1.2 V to about 0 V in Ni(bpy)$_3$(BF$_4$)$_2$, about −0.5V to about 2V in Fe(phendion)$_3$(BF$_4$)$_2$, and about −2.5V to about 1.0V in V(acac)$_3$(BF$_4$)$_2$. In a cell used to measure a cyclic voltammetry curve, an Ag/Ag+ electrode obtained by dissolving 0.3M of AgNO$_3$ using acetonitrile as a solvent was used as a reference electrode, carbon felt was used as a working electrode, and platinum was used as a counter electrode.

The above experimental results are shown in FIGS. 2A through 2D. FIGS. 2A through 2D illustrate Preparation Examples 1 through 4, respectively.

As illustrated in FIGS. 2A through 2D, in electrolytes including the metal-ligand coordination compound according to the invention, a reversible oxidation/reduction peak can be observed.

Example 1

0.2 M of Fe(phendion)$_3$BF$_4$ was dissolved in 5 ml of acetonitrile to be used as a catholyte solution and 0.2 M of Ni(bpy)$_3$BF$_4$ was dissolved in 5 ml of acetonitrile to be used as an anolyte solution. Then, charging was performed. 1.0M of TEABF$_4$ salt was dissolved in acetonitrile to be used as the supporting electrolyte in the catholyte and the anolyte, respectively.

An electrode prepared by thermally treating carbon felt (Nippon Graphite, GF20-3, t=3 mm, A=5×5 cm$^2$) for 5 hours at 500° C. in an air atmosphere was used, and a non-flow type battery was manufactured and evaluated. A Na conductive Nafion® membrane (product name: Nafion® 117, manufacturer: DuPont) was used as the ion exchange membrane.

A nut integrated end plate was disposed at the bottom, and an insulator, a current collector, and a bipolar plate were stacked on the end plate. A square carbon felt electrode having a size of 5×5 cm$^2$ was cut in half so as to make a rectangle electrode and then, the electrode was inserted into a concave of the bipolar plate.

3 ml of an organic electrolyte solution manufactured as above was injected into a positive carbon felt electrode and a negative carbon felt electrode manufactured as above, and then the positive carbon felt electrode and the negative carbon felt electrode were assembled. A bolt, to which a Belleville® spring was fixed, was tightened to 1.5 Nm in a diagonal order using a torque wrench. After completing assembly, the remaining electrolyte solution was injected through an injection hole of each electrode and then, the injection hole was blocked using a Teflon® bolt. A Teflon® bolt having a gas leak hole was used for each bipolar plate.

Example 2

A redox flow battery was manufactured in the same manner as in Example 1 except that V(acac)$_3$BF$_4$ was used instead of Ni(bpy)$_3$BF$_4$.

Comparative Example 1

1 M of a $V^{2+}$ solution and a $V^{5+}$ solution were manufactured from an aqueous solution having a composition of 1 M of VOSO$_4$ (Aldrich, 97% hydrate) and 2 M of H$_2$SO$_4$ (Aldrich 96% solution) and were used as a catholyte and an anolyte. A carbon felt (Nippon Graphite, GF20-3, t=3 mm, A=5×5 cm$^2$) was used as an electrode and Nafion® 117 substituted with hydrogen ions was used as an ion exchange membrane. The method of assembling an all-vanadium battery and the order are the same as those of Example 1.

Comparative Example 2

A redox flow battery was manufactured in the same manner as in Example 1 except that Fe(bpy)$_3$BF$_4$ was used instead of Fe(phendion)$_3$BF$_4$ and Fe(bpy)$_3$BF$_4$ was used instead of Ni(bpy)$_3$BF$_4$.

Comparative Example 3

A redox flow battery was manufactured in the same manner as in Example 1 except that Fe(bpy)$_3$BF$_4$ was used instead of Fe(phendion)$_3$BF$_4$.

Charge/Discharge Evaluation (Non-Flow Type Battery)

A charge/discharge experiment was performed at room temperature (25° C.) by using the battery manufactured as above.

The battery was charged with 5 to about 10 mA at a constant current at about 2.6 to about 2.8 V. The battery was discharged with 5 to about 10 mA at a constant current at about 1.8 V.

The experimental results are shown in Table 1.

TABLE 1

| System | | Average discharge voltage, V | Efficiency, % | |
|---|---|---|---|---|
| | | | Charge/discharge | energy |
| Comparative Example 1 | All VRB | 1.36 | 22.7 | 22.4 |
| Comparative Example 2 | Fe(bpy)$_3$/Fe(bpy)$_3$ | 2.26 | 87.2 | 79.7 |
| Comparative Example 3 | Fe(bpy)$_3$/Ni(bpy)$_3$ | 2.18 | 61.3 | 57.2 |
| Example 1 | Fe(phendion)/ Ni(bpy) | 2.46 | 92.1 | 85.2 |

Charge and discharge efficiency is represented by the percentage of the value obtained by dividing the charge amount by the discharge amount, and energy efficiency is represented by the value obtained by multiplying voltage efficiency by charge and discharge efficiency. As shown in Table 1, charge and discharge efficiency is 92.1% in Example 1 and is improved by 4.05 times or more compared with Comparative Example 1 having a charge and discharge efficiency of 22.7%. Also, energy efficiency is 85.2% in Example 1 and is improved by 3.8 times or more compared with Comparative Example 1, which is a water-based system, having an energy efficiency of 22.4%.

As described above, according to the one or more of the above embodiments of the invention, a redox flow battery having high energy density and excellent charge/discharge efficiency is provided by the invention as well as catholyte and anolyte solutions and electrode cells containing the same.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A redox flow battery comprising:
a positive electrode cell comprising a positive electrode and a catholyte solution; a negative electrode cell comprising a negative electrode and an anolyte solution; and anion exchange membrane interposed between the positive electrode cell and the negative electrode cell, wherein the catholyte solution and the anolyte solution each include a solvent, a supporting electrolyte, and at least one metal-ligand coordination compound, wherein at least one of the metal-ligand coordination compounds includes a ligand that contains an electron withdrawing group, and wherein the electron withdrawing group is a halogen atom, an oxygen atom, a phosphorous atom, a sulfur atom, a nitro group, a nitrile group, or a phenyl group, wherein said ligand is aliphatic.

2. The redox flow battery of claim 1, wherein a metal included in the metal-ligand coordination compound is at least one selected from the group consisting of Ni, Co, Fe, Ru, Zn, Mn, Y, Zr, Ti, Cr, Mg, Ce, Cu, Pb, and V.

3. The redox flow battery of claim 1, wherein the ligand included in the metal-ligand coordination compound is at least one selected from the group consisting of acetylacetonate, ethylenediamine, and propylenediamine.

4. The redox flow battery of claim 1, wherein the concentration of the metal-ligand coordination compound in the solution is in a range of about 0.1 M to about 3 M.

5. The redox flow battery of claim 1, wherein the at least one metal-ligand coordination compound is at least one of compounds:

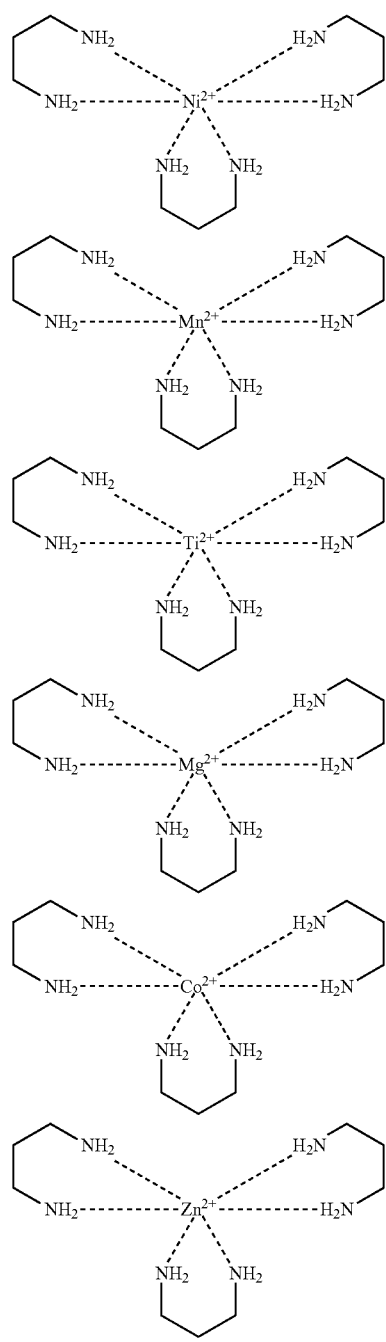

-continued

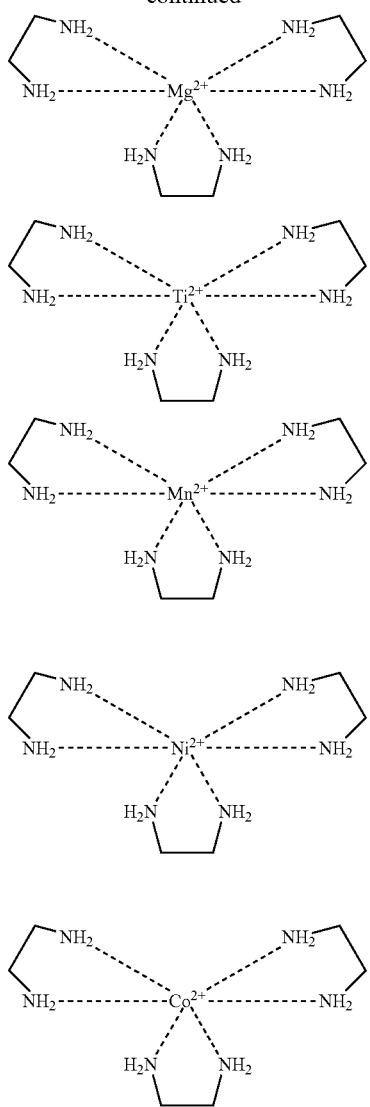

-continued

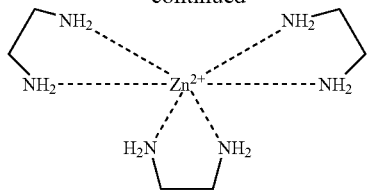

6. The redox flow battery of claim 1, wherein the metal-ligand coordination compound is subject to a reversible oxidation and reduction reaction.

7. The redox flow battery of claim 1, wherein the solvent is a non-aqueous solvent.

8. The redox flow battery of claim 7, wherein the non-aqueous solvent is at least one selected from the group consisting of dimethylacetamide, diethylcarbonate, dimethylcarbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide.

9. The redox flow battery of claim 1, further comprising $BF_4^-$, $PF_6^-$, $CF_3SO_3^-$, or $(CF_3SO_2)_2N^-$ as a counter anion of the metal-ligand coordination compound.

10. The redox flow battery of claim 1, wherein the supporting electrolyte comprises at least one selected from the group consisting of $LiBF_4$, $LiPF_6$, $LiClO_4$, $LiCF_3SO_3$, $Li(CF_3SO_2)_2N$, $TEABF_4$ (triethylamine tetrafluorborate), $TBABF_4$ (tributhylamine tetrafluorborate), $NaBF_4$, $NaPF_6$, trimethylsulfonylchloride, and $(NH_4)_2SO_4$.

11. The redox flow battery of claim 1, wherein the ion exchange membrane is an anion ion exchange membrane.

12. The redox flow battery of claim 11, wherein the anion ion exchange membrane comprises an anion exchange membrane that is obtained by aminating a copolymer of styrene-divinylbenzene by introducing a chloromethyl group, an anion exchange membrane that is obtained by substituting a copolymer of vinylpyridine-divinyl benzene with quaternary pyridium, or an anion exchange membrane that is obtained by aminating an aromatic polysulfone copolymer by introducing a chloromethyl group.

13. The redox flow battery of claim 1, further comprising a catholyte tank and an anolyte tank that are fluid-connected to the positive electrode cell and the negative electrode cell, respectively.

* * * * *